US009932953B2

(12) United States Patent

Braun et al.

(10) Patent No.: US 9,932,953 B2

(45) Date of Patent: Apr. 3, 2018

(54) HEATING DEVICE FOR A DRIVE UNIT IN A MOTOR VEHICLE AND METHOD FOR CONTROLLING SUCH A HEATING DEVICE

(71) Applicant: GM GLOBAL TECHNOLOGY OPERATIONS LLC, Detroit, MI (US)

(72) Inventors: Florian Braun, Frankfurt (DE); Michael Franz, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 451 days.

(21) Appl. No.: 14/610,950

(22) Filed: Jan. 30, 2015

(65) Prior Publication Data

US 2015/0219061 A1 Aug. 6, 2015

(30) Foreign Application Priority Data

Feb. 1, 2014 (DE) ........................ 10 2014 001 381

(51) Int. Cl.

*F02N 9/02* (2006.01)
*F02N 19/02* (2010.01)

(Continued)

(52) U.S. Cl.

CPC ......... *F02N 19/02* (2013.01); *B60H 1/00271* (2013.01); *F02D 41/1494* (2013.01);

(Continued)

(58) Field of Classification Search

CPC ............. F02N 19/02; F02N 2200/0802; F02N 2200/102; F02N 2200/103;

(Continued)

(56) References Cited

U.S. PATENT DOCUMENTS 2,803,295 A * 8/1957 Ambrose ................ F02P 19/00 123/142.5 E
3,114,360 A * 12/1963 Snelling .................. F02N 19/02 123/142.5 E (Continued)

FOREIGN PATENT DOCUMENTS

DE 3426305 A1 * 12/1986 ......... B60H 1/00492
DE 4223954 C1 1/1994

(Continued)

OTHER PUBLICATIONS

"DE_102005061878_A1_M—Machine Translation.pdf", machine translation, EPO.org, Apr. 13, 2017.*

(Continued)

*Primary Examiner* — Gregory Huson
*Assistant Examiner* — Daniel E Namay
(74) *Attorney, Agent, or Firm* — Lorenz & Kopf, LLP

(57) ABSTRACT

A heating device for a drive unit in a motor vehicle includes at least one heating element and at least one sensor by means of which a predetermined behavior of the vehicle user preceding the start of the drive unit can be detected. The sensor interacts with the heating element in such a manner that it is switched on when the sensor detects the predetermined behavior. The predetermined behavior may be one or more of the following: inserting an ignition key in an ignition lock of the motor vehicle; actuating a shifting, clutch or braking device of the motor vehicle; or a behavior through which an anti-theft device of the motor vehicle can be triggered.

14 Claims, 2 Drawing Sheets

(51) Int. Cl.
*B60H 1/00* (2006.01)
*F02N 11/08* (2006.01)
*F02D 41/14* (2006.01)

(52) U.S. Cl.
CPC ......... *F02N 11/084* (2013.01); *F02N 11/0829* (2013.01); *F02N 2200/0802* (2013.01); *F02N 2200/102* (2013.01); *F02N 2200/103* (2013.01); *F02N 2200/106* (2013.01)

(58) Field of Classification Search
CPC ........... F02N 2200/106; F02N 11/0829; F02N 11/084; F02N 11/0807; F02D 41/1494; B60H 1/00271
USPC .................................................. 237/28, 12, 5
See application file for complete search history.

(56) References Cited

U.S. PATENT DOCUMENTS

| | | | | | |
|---|---|---|---|---|---|
| 3,450,977 | A * | 6/1969 | Heinz | F02N 19/02 | 123/179.21 |
| 4,286,126 | A * | 8/1981 | Berginski | H01H 27/063 | 200/11 C |
| 4,385,726 | A * | 5/1983 | Bernauer | F02B 43/10 | 123/1 A |
| 4,991,644 | A * | 2/1991 | Miaoulis | F01N 5/02 | 123/41.14 |
| 5,129,376 | A * | 7/1992 | Parmley | F02N 11/0807 | 123/179.2 |
| 5,433,072 | A | 7/1995 | Swars et al. | | |
| 5,778,844 | A | 7/1998 | Kuettner | | |
| 6,209,500 | B1 * | 4/2001 | Tallio | F02N 19/02 | 123/179.21 |
| 6,481,428 | B1 * | 11/2002 | Makki | F02D 41/024 | 123/179.1 |
| 2006/0144360 | A1 * | 7/2006 | Beaucaire | F02D 41/20 | 123/179.2 |
| 2008/0156285 | A1 * | 7/2008 | King | F02N 19/02 | 123/142.5 E |
| 2008/0191047 | A1 * | 8/2008 | Schmidt | B60H 1/2203 | 237/28 |
| 2009/0184105 | A1 * | 7/2009 | Hasegawa | H05B 1/0236 | 219/497 |
| 2010/0176110 | A1 * | 7/2010 | Ogino | B60H 1/00271 | 219/202 |
| 2012/0286052 | A1 * | 11/2012 | Atluri | B60K 16/00 | 237/28 |
| 2013/0035840 | A1 * | 2/2013 | Holbert | F02N 11/08 | 701/103 |
| 2014/0114532 | A1 * | 4/2014 | Choi | G08G 1/167 | 701/36 |

FOREIGN PATENT DOCUMENTS

| | | | | | |
|---|---|---|---|---|---|
| DE | 4331285 | A1 | | 3/1995 | |
| DE | 102005045231 | A1 | | 3/2007 | |
| DE | 102005061878 | A1 | | 6/2007 | |
| DE | 102010038337 | A1 | | 1/2012 | |
| FR | 2899649 | A3 | | 10/2007 | |
| GB | 2284662 | A | * | 6/1995 | B60H 1/00278 |
| GB | 2466275 | A | | 6/2010 | |
| JP | 62015115 | A | * | 1/1987 | B60H 1/2203 |
| JP | 2005201217 | A | * | 7/2005 | |
| JP | 2015027220 | A | * | 2/2015 | B60H 1/2218 |

OTHER PUBLICATIONS

"FR_2899649_A3_M—Machine Translation.pdf", machine translation, EPO.org, Apr. 13, 2017.*
DPMA, German Search Report for Application No. 102014001381.2, dated Mar. 27, 2014.

* cited by examiner

HEATING DEVICE FOR A DRIVE UNIT IN A MOTOR VEHICLE AND METHOD FOR CONTROLLING SUCH A HEATING DEVICE

CROSS-REFERENCE TO RELATED APPLICATION

This application claims priority to German Patent Application No. 10 2014 001 381.2, filed Feb. 1, 2014, which is incorporated herein by reference in its entirety.

TECHNICAL FIELD

The technical field relates to heating devices for a drive unit in a motor vehicle having at least one heating element and at least one sensor for detecting a predetermined behavior of a vehicle user preceding the start of the drive unit. The sensor interacts with the heating element in such a manner that the same is switched on when the sensor detects the predetermined behavior. The technical area furthermore relates to methods for controlling such heating devices.

BACKGROUND

DE 42 23 954 C1 describes a heating device for a drive unit in a motor vehicle. The heating device includes a heating element and at least one sensor. The sensor is designed in such a manner that it can detect a predetermined behavior of the vehicle user preceding the start of the drive unit. For example, the inserting of the buckle latch of a safety belt in the belt buckle may be detected. More precisely, the sensor detects the engaging of the buckle latch of the safety belt in the belt buckle. Here, the sensor interacts with a control device in such a manner that the control device switches on the heating element when the sensor detects the engaging of the buckle latch of the safety belt in the belt buckle.

Factually, the start of the drive unit by the vehicle user is mostly preceded by putting on a safety belt and the engaging of the buckle latch of the safety belt in the belt buckle accompanied by this, however the engaging of the buckle latch of the safety belt in the belt buckle cannot be understood as a secure indication that the start of the drive unit of the motor vehicle is imminent. It is rather conceivable that the vehicle driver initially puts on the safety belt so that the buckle latch of the safety belt engages in the belt buckle but following this waits for further vehicle users or passengers. Because of this a relatively long heating period is created so that the energy consumption of the heating element and the high loading of the battery of the motor vehicle through the heating element is increased. For this reason, DE 42 23 954 C1 also proposes additional sensors by means of which another predetermined behavior of the vehicle user preceding the start of the drive unit can be detected. In other words, for the sake of safety two or more sensors detect the respective predetermined behavior of the vehicle user before the heating element is switched on. This ultimately merely leads to a more complex construction of the heating device including its sensors.

SUMMARY

In accordance with the present disclosure a heating device for a drive unit in a motor vehicle is provided that can be operated in an energy-saving manner or/and has a simple structure. The heating element belonging to the heating device is to be switched on only in particular when the start of the drive unit by the vehicle user is almost certainly directly imminent. Furthermore, the present disclosure provides a correspondingly advantageous method for controlling such a heating device for a drive unit in a motor vehicle.

An embodiment of the present disclosure relates to a heating device for a drive unit in a motor vehicle. The drive unit preferentially is an internal combustion engine, particularly preferably a diesel engine, wherein in particular in the case of diesel engines heating preceding the start of the drive unit by the vehicle user is required in order to ensure secured functioning of the internal combustion engine operating according to the Diesel principle. The heating device for this purpose includes at least one heating element, which can for example be designed as a glow plug. In addition to this, the heating device includes at least one sensor.

The sensor is designed and arranged in such a manner that a predetermined behavior of the vehicle user preceding the start of the drive unit can be detected by means of said sensor in order to obtain a secure indication that the start of the drive unit by the vehicle user is directly imminent, and in order to ensure short and secure heating-up of the drive unit before the start of the latter. Here, the sensor interacts with the heating element—if appropriate by way of a suitable control device—in such a manner that the heating element is switched on when the sensor detects the predetermined behavior.

In a first alternative, the predetermined behavior of the vehicle user is the inserting of an ignition key in an ignition lock. Accordingly, the sensor can be designed for example in such a manner that it detects the complete insertion of the ignition key in the ignition lock however it is likewise possible, even advantageous, when the sensor detects the already partial insertion of the ignition key in the ignition lock in order to subsequently switch on the heating element.

In a second alternative, the previously mentioned predetermined behavior of the vehicle user consists in that the same actuates a shifting, clutch or braking device of the motor vehicle especially since actuating the shifting, clutch or braking device of the motor vehicle can be seen as a secure indication that the start of the drive unit by the vehicle user is directly imminent, as is the case with the previously mentioned alternative of inserting the ignition key in the ignition lock. In the case of a manual shift transmission of the motor vehicle it is preferred when the predetermined behavior consists in the actuation of the clutch device or of the shifting device of the motor vehicle, while in the case of an automatic transmission of the motor vehicle it is preferred when the predetermined behavior consists in the actuation of the braking device or/and the shifting device of the motor vehicle, especially since in the case of the automatic transmission a shifting device for shifting the same into the stages P, R, N and D is also present, but an actuatable clutch device is omitted. In a third alternative, the predetermined behavior that precedes the start of the drive unit and ultimately leads to the heating element being switched on corresponds to a behavior by way of which an anti-theft device of the motor vehicle that is present anyhow can be triggered. This has the advantage that as sensor of the heating device the sensor of the anti-theft device that is present anyhow can be used so that substantially less effort is required in order to realize the heating device in addition to the anti-theft device that is present anyhow.

In a preferred embodiment of the heating device according to the present disclosure, the sensor of the heating device is assigned to the ignition lock of the motor vehicle in order to be able to securely detect the inserting of the ignition key in the ignition lock with the help of the sensor in order to switch on the heating element thereupon.

In a further preferred embodiment of the heating device according to the present disclosure, the sensor of the heating device is assigned to a shifting lever of the shifting device, i.e. for example a shifting lever of the shifting device of the motor vehicle assigned to the driver's seat, which is preferentially provided on the centre console, a clutch pedal of the clutch device of the motor vehicle or a brake pedal of the braking device of the motor vehicle in order to be able to determine in the respective embodiment the actuation of the shifting, clutch or braking device of the motor vehicle securely and without delay.

In a further preferred embodiment of the heating device according to the present disclosure, the sensor of the heating device is formed by a sensor of an anti-theft device that is present anyhow. This sensor can for example be a sensor in the vehicle interior, for example on the roof headlining, by means of which it can be detected if a vehicle user is present within the motor vehicle. However, other sensors of the anti-theft device are also conceivable, wherein in this respect reference is made to the prior art. As already indicated at the outset, the expenditure of the heating device in terms of equipment is reduced especially since the sensor of the anti-theft device that is present anyhow also serves as sensor for the heating device in order to detect the predetermined behavior of the vehicle user preceding the start of the drive unit and thereupon switch on the heating element.

In a particularly preferred embodiment of the heating device according to the present disclosure, the ignition key can be inserted in the ignition lock up to a maximum insertion length. In this embodiment, the sensor is assigned to the ignition lock in such a manner that the insertion of the ignition key in the ignition lock can be detected by the sensor even before reaching the maximum insertion length. In other words, inserting the ignition key in the ignition lock is detected early on so that the heating element is switched on and sufficient time remains in order to preheat the drive unit via the heating element of the heating device. In this embodiment is has proved to be advantageous when the sensor is assigned to the ignition lock in such a manner that inserting the ignition key in the ignition lock can be detected by the sensor even before reaching a maximum of 20%, particularly preferably a maximum of 10% of the maximum insertion length in order to gain time which makes possible relatively long heating of the drive unit by the heating element of the heating device even when the vehicle user would like to start the drive unit relatively shortly after the complete insertion of the ignition key in the ignition lock up to the maximum insertion length by turning the ignition key.

In a further preferred embodiment of the heating device according to the present disclosure, the shifting lever of the shifting device, the clutch pedal of the clutch device or the brake pedal of the braking device of the motor vehicle can be actuated or moved over a maximum actuation travel. Here, the sensor is assigned to the shifting lever, the clutch pedal or the brake pedal in such a manner that actuation can be detected by the sensor even before reaching the maximum actuation travel. As already described in connection with the embodiment mentioned above the actuation of the shifting lever, clutch pedal or brake pedal is detected early on by the sensor because of this, even before the shifting lever, the clutch pedal or the brake pedal has been actuated over its maximum actuation travel so that a greater period of time remains for the heating element to heat up the drive unit. In this connection it is preferred when the sensor is assigned to the shifting lever, the clutch pedal or the brake pedal in such a manner that actuation is detected by the sensor even before reaching a maximum of 20%, particularly preferably a maximum of 10% of the maximum actuation travel.

If the sensor is assigned to the shifting lever, this poses the question as to what the maximum actuation travel of the shifting lever should be especially since the shifting lever can be moved into different shifting positions. Accordingly, the maximum actuation travel of the shifting lever can for example be that actuation travel between two shifting positions of the shifting lever which is greatest. However, in order to be able to detect actuation of the shifting device of the motor vehicle or of its shifting lever by the sensor as quickly as possible, the maximum actuation travel of the shifting lever in a further particularly preferred embodiment of the heating device according to the present disclosure is an actuation travel between two shifting positions of the shifting lever adjacent to one another. Since in this case more than two shifting positions of the shifting lever adjacent to one another are also possible in this case in principle, the maximum actuation travel of the shifting lever is preferentially an actuation travel between two of three or more shifting positions of the shifting lever adjacent to one another, which are adjacent to one another preferentially subject to forming the shortest actuation travel.

Moreover it is preferred with this embodiment when one of the two shifting positions is a park or neutral position of the shifting lever. Here, a park position of the shifting lever is provided in particular in motor vehicles with automatic transmission while in particular in manual-shift transmission a neutral position of the shifting lever is provided into which the shifting lever automatically returns when no gear is engaged. Obviously, such a neutral position can also be provided with an automatic transmission, wherein the vehicle user in this case has to specifically move the shifting lever into the neutral position. This embodiment version has the advantage that a vehicle user or driver generally moves the shifting lever into the park or neutral position with parked or stationary vehicle and switch-off drive unit. If the vehicle user intends to restart the vehicle, said user will initially move the shifting lever generally from the park or neutral position into another shifting position before the vehicle user starts the drive unit. Consequently the actuation of the shifting lever can be seen as a strong indication that the start of the drive unit is directly imminent in order to thus achieve a brief however adequate preheating of the drive unit via the heating element of the heating device.

In a further particularly advantageous embodiment of the heating device according to the present disclosure, the sensor is assigned to the shifting lever in such a manner that actuation can be detected even when the shifting lever leaves a park or neutral position. This embodiment is suitable in particular for manual-shift transmissions.

In an advantageous embodiment of the heating device according to the present disclosure, the anti-theft device of the motor vehicle already mentioned previously includes an alarm trigger which interacts with the sensor of the anti-theft device in such a manner that the alarm trigger outputs an alarm signal when the sensor detects a behavior triggering the anti-theft device. Since outputting an alarm signal by the alarm trigger however is undesirable when the sensor is to merely serve for detecting the predetermined behavior of the vehicle user preceding the start of the drive unit in order to switch on the heating element in this case, the alarm trigger of the anti-theft device can be preferentially deactivated independently on the sensor of the anti-theft device. The term deactivation in this connection must be understood in the wider sense, accordingly, deactivation of the alarm trigger can for example consist in a switching-off of the same or merely in a decoupling of the same from the sensor of the anti-theft device.

Thanks to the deactivatability of the alarm trigger independently of the sensor of the anti-theft device it is ensured that the sensor of the anti-theft device can equally function as sensor of the heating device without however also triggering the alarm trigger of the anti-theft device in the event of the predetermined behavior of the vehicle user preceding the start of the drive unit being detected. As already indicated before, a substantial advantage consists in that the sensor of the anti-theft device can equally serve as sensor of the heating device, as a result of which the expenditure in terms of construction or equipment within the vehicle is reduced. It is additionally advantageous in this embodiment when the sensor does not interact with the heating element for as long as the alarm trigger is activated in order to avoid switching on the heating element in the case of a break-in or theft.

The previously mentioned heating element can in general be operated in any manner but in a further advantageous embodiment of the heating device according to the present disclosure the heating element is an electric heating element. The heating element in the form of the electric heating element in this case can be preferably operated with the battery power of the motor vehicle. The heating element which is designed as an electric heating element furthermore is particularly preferably designed as a glow plug. In addition to this it is preferred when the heating element is arranged in the combustion chamber of the drive unit or at least assigned to the combustion chamber of the drive unit in such a manner that heating-up of the combustion chamber is possible.

Deviating from the arrangement of the heating element in or near the combustion chamber of the drive unit described above, the heating element in a further advantageous embodiment of the heating device according to the present disclosure is arranged for heating or preheating other components of the drive unit or the drive train. Accordingly, the heating element can for example be assigned to a sensor for detecting the exhaust composition for example to a so-called lambda probe. In this way, the heating element would ensure that the sensor for detecting the exhaust gas composition or the lambda probe operates in a predetermined temperature range that is necessary in order to achieve secure functioning of the sensor for detecting the exhaust gas composition or the lambda probe.

The following method according to the present disclosure for controlling a heating device for a drive unit, in particular an internal combustion engine or diesel engine, in a motor vehicle is also disclosed. Initially, the behavior of the vehicle user is monitored. Should the monitoring of the behavior of the vehicle user detect a predetermined behavior of the vehicle user preceding the start of the drive unit, a heating element of the heating device is switched on in order to heat or preheat the drive unit or components which are operationally connected with the drive unit. The predetermined behavior in this case is one or more of the following: the inserting of an ignition key in an ignition lock of the motor vehicle; the actuating of a shifting, clutch or braking device of the motor vehicle; or a behavior by way of which an anti-theft device of the motor vehicle can be triggered. With respect to the advantages of this embodiment of the method according to the present disclosure and further embodiments, reference is made to the advantages described above making reference to the embodiments of the heating device according to the present disclosure, which correspondingly apply to the method.

In a preferred embodiment of the method according to the present disclosure, the predetermined behavior is detected even before the end of the inserting of the ignition key or before the end of the actuating of the shifting, clutch or braking device so that the heating element is switched on at an early stage and sufficient time remains for preheating the drive unit.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background of the present disclosure or the following detailed description.

Figure 1:
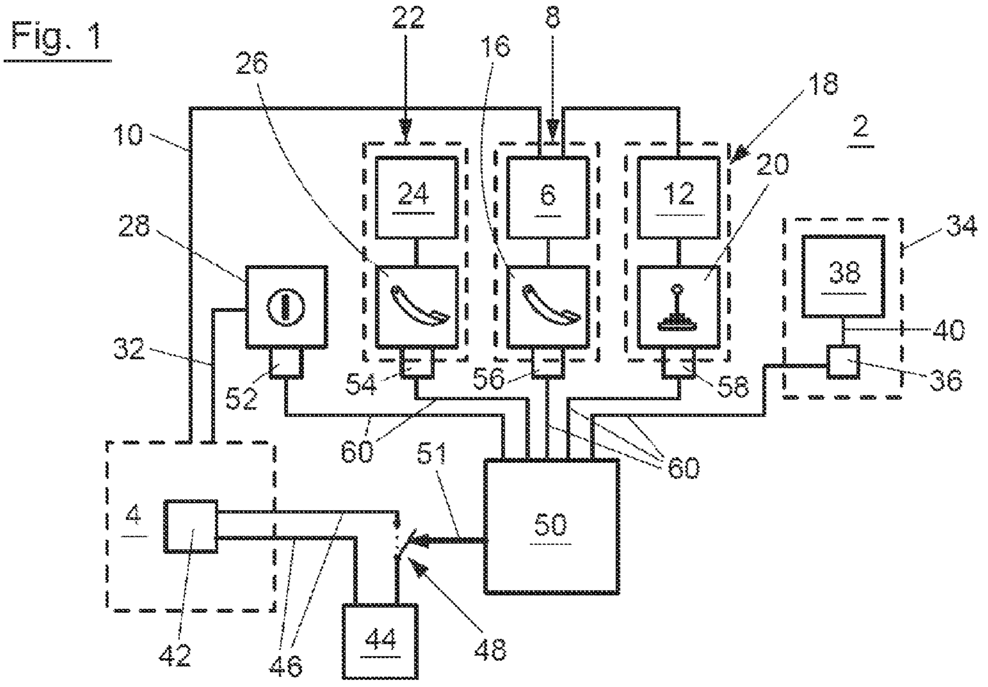
FIG. 1 a schematic representation of a motor vehicle with an embodiment of the heating device according to the present disclosure.

FIG. 1 shows at least schematically a motor vehicle 2 with an embodiment of the heating device according to the present disclosure. The motor vehicle 2 includes a drive unit 4, preferentially an internal combustion engine or diesel engine. The output side of the drive unit 4 is in rotational drive connection with the input side of a clutch 6, for example a friction disc clutch, of a clutch device 8, as is indicated with the help of the line of action 10.

In addition to the clutch 6, the clutch device 8 includes a clutch pedal 16 which interacts with the clutch 6 in such a manner that the clutch 6 by actuating the clutch pedal 16 can be open and by releasing the clutch pedal 16, closed. The transmission 12 in the shown embodiment is a manual-shift transmission, wherein the transmission 12 for this purpose is assigned a shifting device 18, by means of which the transmission 12 can be shifted, wherein the shifting device 18 includes a corresponding shifting lever 20 which can be actuated by the vehicle user or driver.

In addition to this, the motor vehicle 2 includes a braking device 22 for braking the motor vehicle 2, wherein the braking device 22 includes at least one brake 24, for example a disc brake, and a brake pedal 26, which can be actuated by the vehicle user or driver in order to transfer the brake 24 into a closing position, in which the brake 24 of the braking device 22 brakes the motor vehicle. The motor vehicle 2 furthermore includes an ignition lock 28, in which an ignition key 30 schematically indicated in FIG. 2 can be inserted, wherein the driver unit 4 can be started by turning the ignition key 30 inserted in the ignition lock 28, as is indicated with the help of the line of action 32 in FIG. 1.

In addition to this, the motor vehicle 2 includes an anti-theft device 34. The anti-theft device 34 substantially consists of a sensor 36 of the anti-theft device 34 and an alarm trigger 38, wherein the sensor 36 of the anti-theft device 34 interacts with the alarm trigger 38 of the anti-theft device 34 in such a manner that the alarm trigger 38 outputs an alarm signal when the sensor 36 senses a behavior triggering the anti-theft device 34. This behavior triggering the anti-theft device 34 can for example be seen in that a human or object enters the motor vehicle interior. Consequently, the sensor 36 can be embodied for example as an ultrasound sensor. The operative connection between sensor 36 and alarm trigger 38 is indicated in FIG. 1 with the help of the line of action 40, wherein the alarm trigger 38 can be deactivated independently of the sensor 36 of the anti-theft device 34, which for example can be achieved by severing the line of action 40. Accordingly, a corresponding switch can for example be provided on the remote control of the anti-theft device 34 in order to deactivate the alarm trigger 38 independently of the sensor 36.

The heating device furthermore includes at least one heating element 42. The heating element 42 is designed as an electric heating element, preferentially as a glow plug and assigned to the drive unit 4, so that the drive unit 4 or components to be assigned to the drive unit 4 can be preheated by the switched-on heating element 42. The electric heating element 42 in this case can be operated with current of a battery 44 of the motor vehicle 2, wherein the corresponding supply lines 46 are indicated in FIG. 1. In one of the supply lines 46 a switch 48 is provided, by means of which the heating element 42 can be switched on and off for the purpose of preheating the drive unit 4. The heating element 42 is arranged in the combustion chamber of the drive unit 4 but can also be provided elsewhere on or in the drive unit 4 or on or in the drive train. In order to actuate the switch 48 and thus switch the heating element 42 on or off, a control device 50 is provided which is operationally connected to the switch 48 via the control line 46 in a suitable manner. The control device 50 thus forms a component of the heating device, wherein the control device 50 of the heating device can also be integrated in an already existing control device of the motor vehicle 2.

The heating device furthermore includes at least one sensor by means of which a predetermined behavior of a vehicle user preceding the start of the drive unit 4 can be detected, wherein the corresponding sensor interacts with the heating element 42 in such a manner that the heating element 42 is switched on when the corresponding sensor detects the predetermined behavior. In FIG. 1, multiple sensor 52 to 58 of the mentioned type are shown, each of which are connected to the control device 50 via a signal line 60, while the sensor 36 of the anti-theft device 34 can also be connected to the control device 50 via a signal line 60. In principle, merely one of the sensors 52, 54, 56, 58, 36 is required, but two or more of the shown sensors 52, 54, 56, 58, 36 can also be provided combined with one another. Thus, FIG. 1 shows an embodiment of the heating device including multiple embodiment versions, wherein in the following the individual embodiment versions which can be combined as required or used by themselves will also be discussed in the following.

Figure 2:
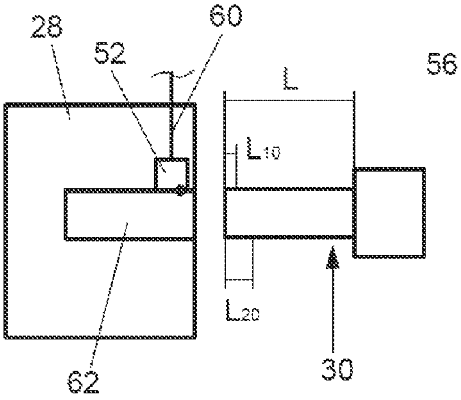
FIG. 2 a schematic representation of the ignition lock and of the ignition key from FIG. 1.

In the first embodiment version with the sensor 52, the sensor 52 is assigned to the ignition lock 28 in such a manner that the predetermined behavior of the vehicle user consists of the inserting of the ignition key 30 according to FIG. 2 in the ignition lock 28 detected by the sensor 52 and preceding the start of the drive unit 4. Here, the sensor 52 is assigned to the ignition lock 28. The ignition key 30 can be inserted into the receptacle 62 of the ignition lock 28 up to a maximum insertion length L. The sensor 52 in this case is assigned to the ignition lock 28 or its receptacle 62 in such a manner that inserting the ignition key 30 is detected even before reaching the maximum insertion length L.

Here it has proved to be advantageous when the sensor 52 is assigned to the ignition lock 28 or its receptacle 62 in such a manner that inserting the ignition key 30 in the ignition lock 28 is detected by the sensor 52 even before reaching a maximum of 20%, preferentially a maximum of 10% of the maximum insertion length L, wherein 20% insertion length L is indicated with the help of the insertion length L20 and 10% of the maximum insertion length L with the help of the insertion length L10 in FIG. 2. Consequently, inserting the ignition key 30 in the ignition lock 28 is detected early on by the sensor 52 which emits a corresponding signal to the control device 50 via the signal line 60, wherein the control device 50 consequently closes the switch 48 via the control line 51 in order to switch on the heating element 42.

Figure 3:
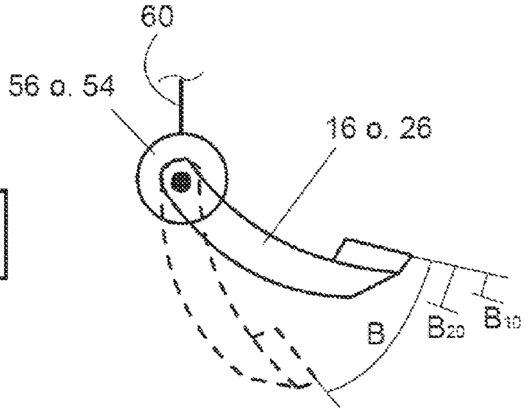
FIG. 3 a schematic representation of the clutch or brake pedal from FIG. 1 in a lateral view.

In a second embodiment version, the sensor 54 or/and the sensor 56 is/are employed. In the second embodiment version, the sensor 56 is designed in such a manner that it can detect the actuation of the clutch device 8 as the predetermined behavior of the vehicle user preceding the start of the drive unit 4. Alternatively or additionally, the sensor 54 is provided by means of which actuation of the braking device 22 of the motor vehicle 2 can be detected as the predetermined behavior of the vehicle user preceding the start of the drive unit 4. Thus, the sensor 58 is assigned to the clutch pedal 16 while the sensor 54 is assigned to the brake pedal 26 of the braking device 22. As is evident from FIG. 3, which shows the clutch or brake pedal 16, 26, the clutch or brake pedal 16, 26 can be actuated over a maximum actuation travel B.

Here, the sensor 56, 54 is assigned to the clutch or brake pedal 16, 26 in such a manner that the actuation of the clutch or brake pedal 16, 26 can be detected by the sensor 56, 54 even before reaching the maximum actuation travel B, in order to be able to switch on the heating element 42 at an early stage via the signal line 60, the control device 50, the control line 51 and the switch 48. Here it has proved to be advantageous when the sensor 56, 54 is assigned to the clutch or brake pedal 16, 26 in such a manner that the actuation can be detected by the corresponding sensor 56, 54 even upon reaching a maximum of 20% or a maximum of 10% of the maximum actuation travel B, wherein 10% of the maximum actuation travel B is indicated with the help of the actuation travel B10 and 20% of the maximum actuation travel B is indicated with the help of the actuation travel B20 in FIG. 3.

Figure 4:
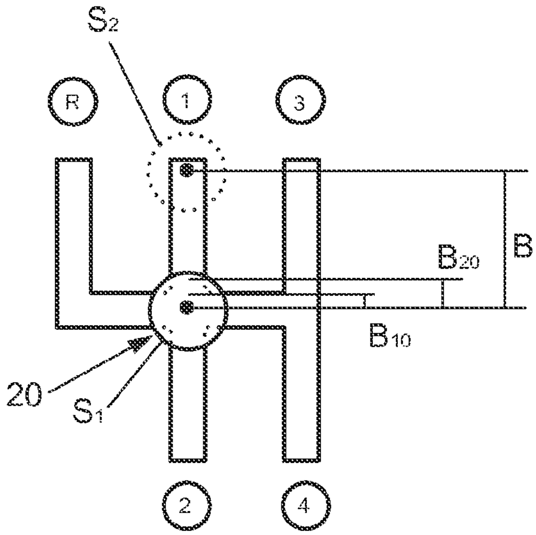
FIG. 4 a schematic representation of the shifting lever from FIG. 1 in a top view.

In a third embodiment version, the sensor 58 is employed which detects the actuation of the shifting device 18 as the predetermined behavior of the vehicle user preceding the start of the drive unit 4. Here, the sensor 58 is assigned to the shifting lever 20 of the shifting device 18, wherein the shifting lever 20—as indicated in FIG. 4—can also be actuated over a maximum actuation travel B. The maximum actuation travel B of the shifting lever 20 in this case is preferably the actuation travel between two shifting positions S1 and S2 of the shifting lever 20 which are adjacent to one another, which are adjacent to one another subject to forming the shortest actuation travel. One of the two shifting positions S1 and S2 in the shown embodiment corresponds to the neutral position of the shifting lever 20, into which the shifting lever 20 automatically returns when the vehicle user has not engaged any of the gears indicated in FIG. 4, wherein in FIG. 4 four gears and a reverse gear are exemplarily indicated.

Although a shifting device 18 for a manual-shift transmission 12 is indicated in FIG. 4, this embodiment version can be analogously used also for the shifting device of an automatic transmission, wherein the shifting position S1 could then corresponds for example to the park or neutral position of the shifting lever 20. In order to achieve as early as possible a switching-on of the heating element 42 as with the two previously described embodiment versions, the senor 58 is assigned to the shifting lever 20 also in the case of the third embodiment version in such a manner that the actuation of the shifting lever 20 can be detected by the sensor 58 even before reaching, preferentially upon reaching a maximum of 20%, particularly preferably a maximum of 10% of the maximum actuation travel B, wherein the associated actuation travels B10 and B20 are also indicated in FIG. 4.

In a fourth embodiment version, the sensor 36 of the anti-theft device 34 equally forms a sensor of the heating device, by means of which predetermined behaviors of the vehicle user preceding the start of the drive unit 4 can be detected. Consequently, the predetermined behavior of the vehicle user preceding the start of the drive unit 4 corresponds to a behavior through which the anti-theft device 34 of the motor vehicle 2 can be triggered. If the authorized vehicle user wishes to open the motor vehicle 2, he initially deactivates the anti-theft device 34. The anti-theft device 34 however is not completely deactivated, but the authorized vehicle user rather merely deactivates the alarm trigger 38 of the anti-theft device 34 in that for example the operative connection between the sensor 36 and the alarm trigger 38 indicated with the help of the line of action 40 is interrupted. The sensor 36 of the anti-theft device 34, which equally represents a sensor of the heating device, by contrast remains activated or is operationally connected to the control device 50 during the course of the deactivation of the alarm trigger 38. If the sensor 36 which continues to be active now detects the authorized vehicle user entering the motor vehicle 2, a movement within the motor vehicle 2, a noise development within the motor vehicle 2 or similar, a corresponding signal is output via the signal line 60 to the control device 50, which in response closes the switch 48 via the control line 51, as a result of which the heating element 42 is switched on.

Figure 5:
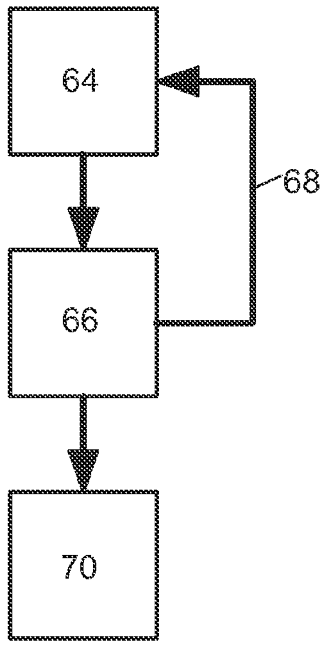
FIG. 5 a flow diagram for illustrating the method for controlling the heating device forming the base of the heating device from FIG. 1.

The method sequence for controlling the heating device for the drive unit 4 in the motor vehicle 2 which is the base of the embodiment versions of the heating device described above is briefly described in the following making reference to FIG. 5.

In the method step 64, the behavior of a vehicle user is monitored by means of at least one of the sensors 52, 54, 56, 58, 36. Within the scope of monitoring, it is checked in a method step 66 if one of the sensor 52, 54, 56, 58, 36 detects the predetermined behavior of the vehicle user preceding the start of the drive unit 4. If this is not the case, monitoring is continued as is indicated in FIG. 5 with the help of the arrow 68. If at least one of the sensors 52, 54, 56, 58, 36 by contrast detects the predetermined behavior of the vehicle user preceding the start of the drive unit 4, monitoring proceeds with method step 70, within the scope of which the corresponding sensor 52, 54, 56, 58, 36 via the associated signal line 60 sends a signal to the control device 50 upon which the control device 50 closes the switch 48 via the control line 51, switching on the heating element 42 in this way.

As already explained before making reference to FIGS. 1 to 4, the predetermined behavior in this case corresponds to the inserting of the ignition key 30 in the ignition lock 28, the actuating of the shifting, clutch or braking device 18, 8, 22 or a behavior through which the anti-theft device 34 could be triggered in principle. It has also been already explained above that the predetermined behavior is detected even before the end of the inserting of the ignition key 30 or before the end of the actuating of the shifting, clutch or braking device 18, 8, 22 by the sensor 52, 58, 56 or 54 in order to ensure early switching-on of the heating element 42 before the imminent start of the drive unit 4 by the vehicle user.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A heating device for a drive unit in a motor vehicle comprising at least one heating element configured to provide heat to the drive unit; and at least one sensor operably coupled to the heating element in such a manner that the heating element is switched on when the sensor detects predetermined behavior;

wherein the predetermined behavior is selected from the group consisting of: insertion of an ignition key in an ignition lock of the motor vehicle; actuation of a shifting, clutch or braking device on the motor vehicle; or a behavior through which an anti-theft device of the motor vehicle can be triggered, wherein the at least one sensor includes a first sensor assigned to the ignition lock, and wherein the ignition key can be inserted in the ignition lock as far as to a maximum insertion length, the first sensor being assigned to the ignition lock in such a manner that inserting the ignition key in the ignition lock can be detected before reaching a percentage of the maximum insertion length.

2. The heating device according to claim 1, wherein the at least one sensor includes a second sensor assigned at least one of the following: a shifting lever of the shifting device, a clutch pedal of the clutch device, a brake pedal of the braking device, or a sensor of the anti-theft device.

3. The heating device according to claim 2, wherein the percentage of the maximum insertion length is 20%.

4. The heating device according to claim 2, wherein the percentage of the maximum insertion length is 10%.

5. The heating device according to claim 2, wherein at least one of the shifting lever, the clutch pedal, and the brake pedal are actuatable over a maximum actuation travel, the second sensor being assigned to at least one of the shifting lever, the clutch pedal or the brake pedal in such a manner that the actuation can be detected before reaching a percentage of the maximum actuation travel.

6. The heating device according to claim 5, wherein the percentage of the maximum actuation travel is 20%.

7. The heating device according to claim 5, wherein the percentage of the maximum actuation travel is 10%.

8. The heating device according to claim 5, in which the maximum actuation travel of the shifting lever is an actuation travel between two adjacent shifting positions of the shifting lever, which are adjacent to one another.

9. The heating device according to claim 8, wherein a first position of the two shifting positions is one of a park position or a neutral position of the shifting lever.

10. The heating device according to claim 9, in which the second sensor is assigned to the shifting lever in such a manner that the actuation can be detected even on leaving the first position.

11. The heating device according to claim 2, wherein the anti-theft device comprises an alarm trigger which interacts with the sensor of the anti-theft device in such a manner that the alarm trigger outputs an alarm signal when the sensor detects a behavior triggering the anti-theft device, wherein the alarm trigger is deactivated independently of the sensor of the anti-theft device.

12. The heating device according to claim 1, wherein the heating element comprises an electric heating element arranged in the combustion chamber of the drive unit, wherein the heating element is operable with power from a battery of the motor vehicle.

13. The heating device according to claim 1, wherein the heating element comprises a glow plug.

14. A method for controlling a heating device for a drive unit in a motor vehicle comprising:

monitoring the behavior of a vehicle user;

detecting a predetermined behavior of the vehicle user preceding the start of the drive unit; and switching on a heating element to provide heat to the drive unit when the predetermined behavior is detected;

wherein the predetermined behavior is selected from the group consisting of: insertion of an ignition key in an ignition lock of the motor vehicle; actuation of a shifting, clutch or braking device on the motor vehicle; or a behavior through which an anti-theft device of the motor vehicle can be triggered, wherein the predetermined behavior comprises insertion of an ignition key in an ignition lock of the motor vehicle, and the predetermined behavior is detected before the end of the inserting of the ignition key.

* * * * *